Oct. 27, 1959     I. VICTOR     2,910,137
METHOD AND APPARATUS FOR THE RECOVERY OF SOLVENT VAPORS
Filed March 26, 1958     3 Sheets-Sheet 2
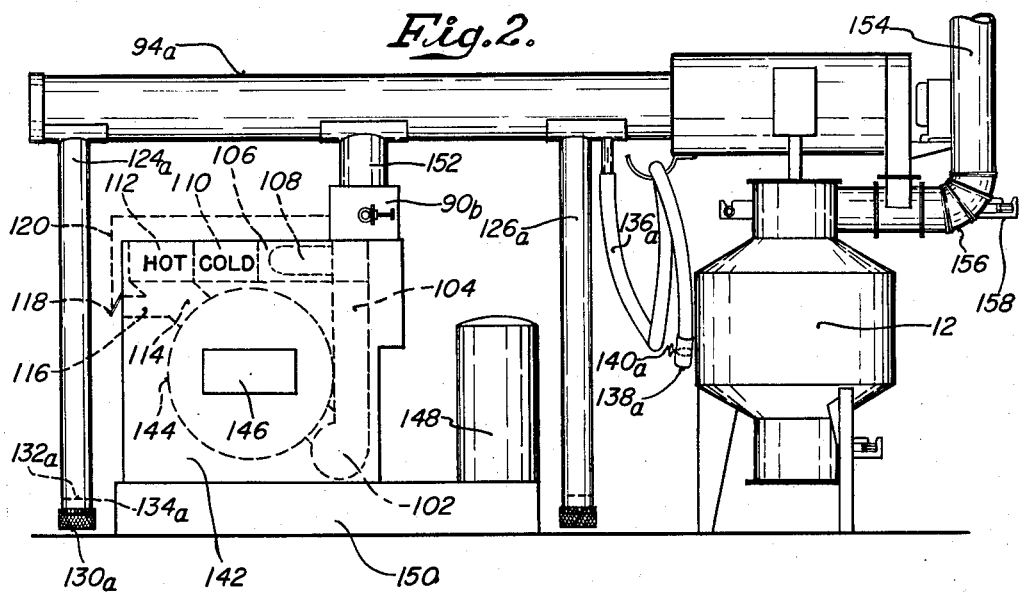
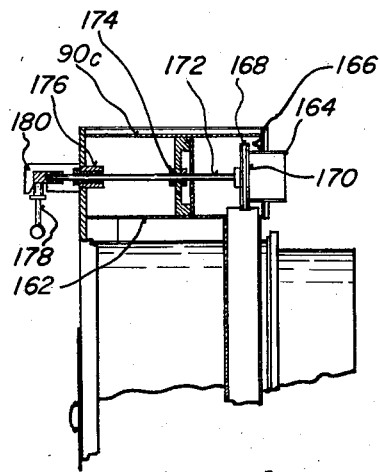
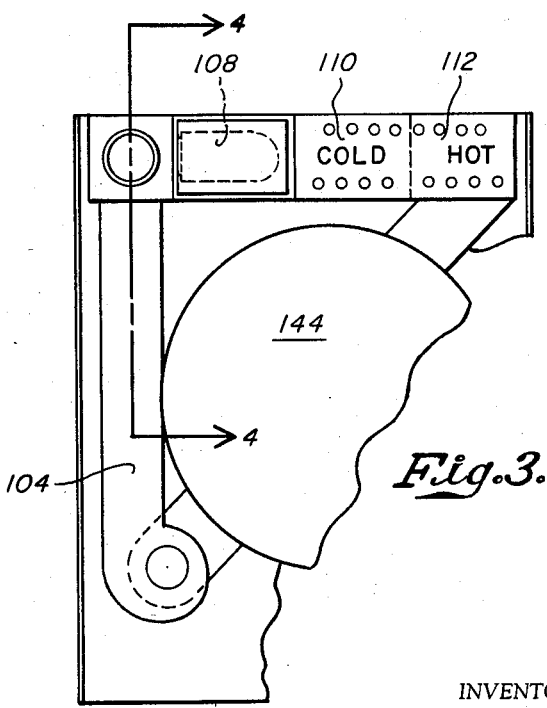
INVENTOR.
Irving Victor
BY Whiteley and Caine
ATTORNEYS

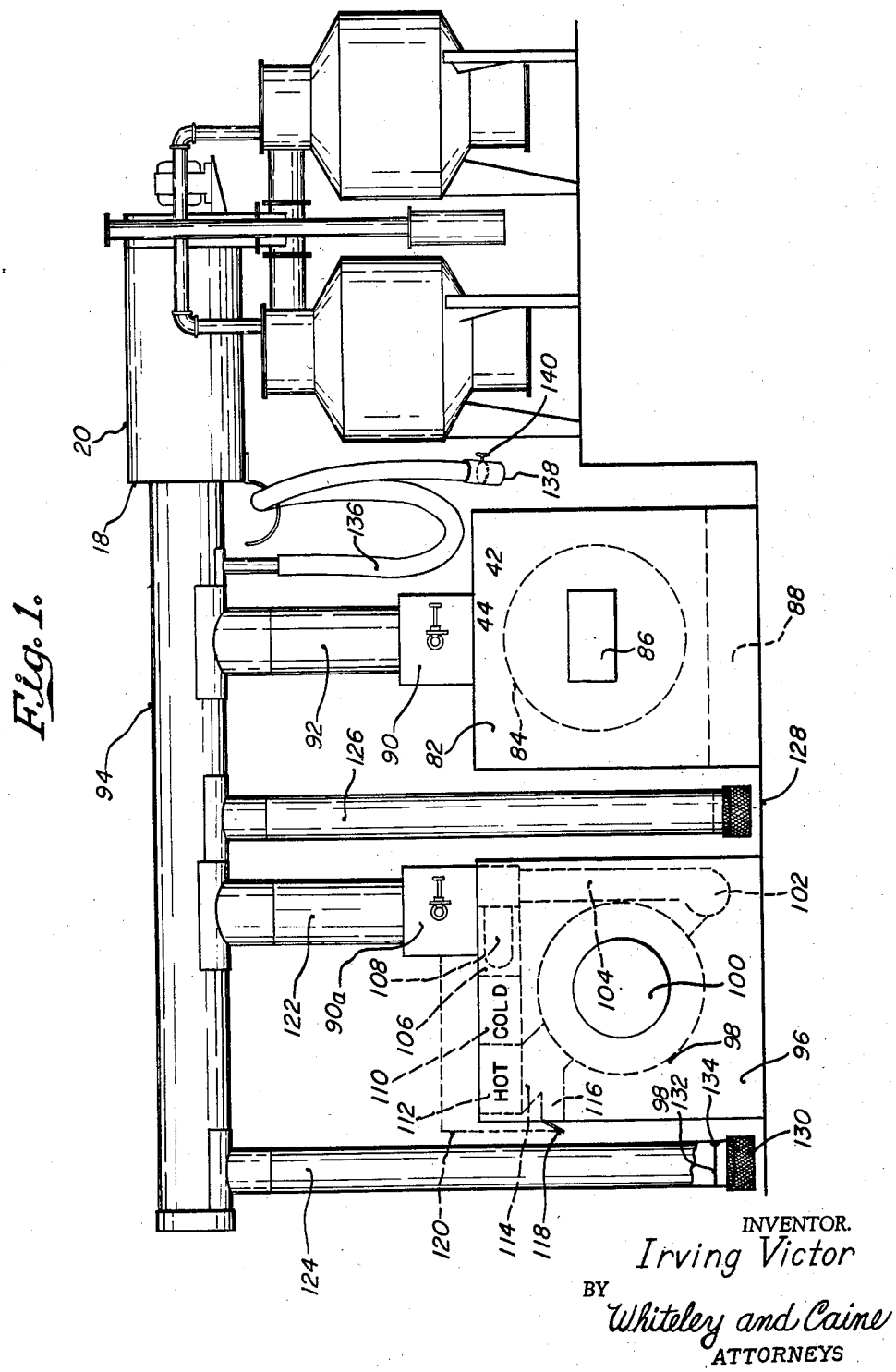

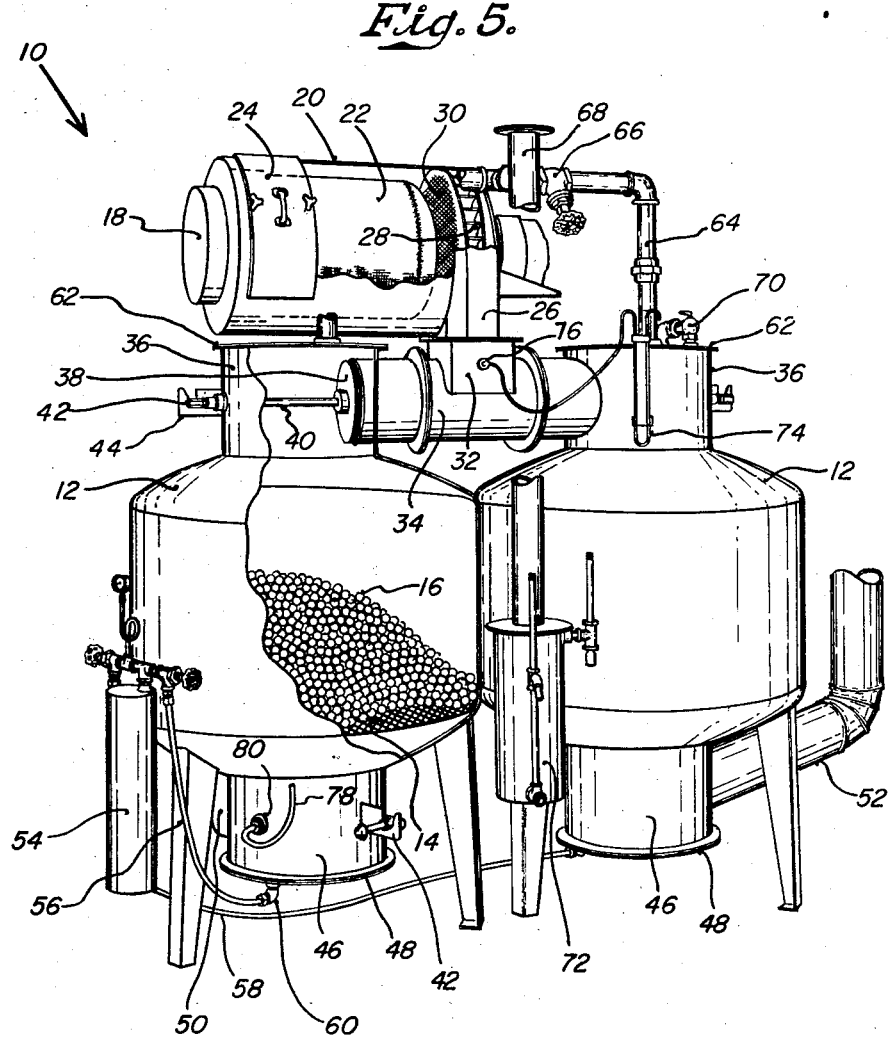

United States Patent Office

2,910,137
Patented Oct. 27, 1959

2,910,137

METHOD AND APPARATUS FOR THE RECOVERY OF SOLVENT VAPORS

Irving Victor, Minneapolis, Minn., assignor to Vic Manufacturing Company Profit Sharing Trust, a trust of Minnesota Application March 26, 1958, Serial No. 724,145

14 Claims. (Cl. 183—4.3)

This invention relates to improvements in method and apparatus for the recovery of vapors of synthetic solvents used in the cleansing of garments and similar materials, and also the degreasing of metal parts. In general, the invention is concerned with the pick-up of solvent vapors from cleaning apparatus, and surrounding areas, and conveying the same to adsorption apparatus. More particularly, the invention is concerned with the pick-up and conveyance of vapors and the cooling and blending of the same with air so as to assure proper collection of the solvent vapors by the adsorption material from whence the solvent is recovered in liquid form.

In one example of the cleansing processes to which this invention is applicable, namely, the dry cleaning of garments and fabrics, the garments are first subjected to a washing operation with liquid solvent whereafter the excess solvent is removed by centrifugal action. The washed garments are then dried in the presence of a body of circulated hot air to remove the embedded solvent. These operations may be conducted in the same apparatus, or where there is a large volume of work, separate units are used for the washing and the drying operation. In conducting these operations a certain amount of solvent is lost through the handling and transfer of liquid solvent, and through residual vapors in the apparatus and in the fabrics. Such losses are not only uneconomical in view of the high cost of synthetic solvents, but are also undesirable because of air pollution. Synthetic solvents are noxious and when liberated within the cleaning plant are not readily removed by the usual form of ventilation. When exhausted to the outside atmosphere, such vapors tend to join with moisture and other air borne impurities to form "smog." For all of the foregoing reasons, it is essential to recover the solvent vapors that have heretofore been lost.

In my co-pending application, Ser. No. 644,155, I have disclosed a method and apparatus for recovering solvent vapors by the use of activated carbon as an adsorbent. While it is known that activated carbon has the ability to adsorb solvent vapors, the application of this principle to the adsorption of vapors in conjunction with the solvent cleansing of garments or the degreasing of metal parts gave rise to several new problems. For example, in one stage of the dry cleaning operation, the solvent vapors are quite hot, and said vapors may also be in a relatively concentrated condition. It was discovered that if the temperature of the gases passing to the carbon bed was excessively high, the adsorption efficiency of the carbon rapidly declined. Likewise, if the concentration of solvent vapors in the mixture passing to the carbon bed was unusually high, the adsorption capacity of the carbon rapidly declined. As a result of these observations, it was determined that as applied to the recovery of vapors from chlorinated hydrocarbons, such as are used in a cleaning operation, it is essential to cool such vapors before adsorption, and in the case of enriched vapors, it is essential to blend such vapors with air in order to obtain efficient recovery.

In the present invention, I have provided apparatus for use in conjunction with a solvent cleansing process to recover the volatile solvent vapors from the cleaning apparatus and its environment. The apparatus includes one or more adsorption units, together with means for withdrawing vapors and air under controlled conditions to assure an adequate pick-up of the vapors, as well as blending ambient air with said vapors to reduce the concentration of vapors and the temperature thereof to within limits whereby the adsorption material will properly remove the vapors from the mixture to assure a substantially complete recovery of vapors.

An object of the invention is to provide an efficient method of recovering the vapors of a synthetic solvent used in the cleansing of materials.

Another object is to provide a method of recovering synthetic solvent vapors from a material cleansing operation by blending air with enriched vapors to form a relatively dilute mixture and passing the mixture through a bed of adsorbing material.

Another object is to provide a method of increasing the efficiency of adsorption of synthetic solvent vapors by reducing the temperature of said vapors prior to contact with the adsorption mass.

Another object is to increase the efficiency of the adsorption of the vapors of synthetic solvents used in the cleansing of materials by combining said vapors with air to reduce the temperature and concentration of the vapors prior to passage through an adsorbing bed to thereby increase the adsorbing capacity of the material forming the bed.

A further object is to provide a solvent vapor recovery apparatus for use in conjunction with solvent cleansing equipment for picking up solvent vapors and blending them in proper proportion with air prior to the passage through a vapor adsorbing bed to efficiently recover the solvent vapors.

Other and further objects may become apparent from the following specification and claims and in the appended drawings in which:

Fig. 1 is an elevation of apparatus forming a material cleansing operation together with means for recovering the vapors of solvent used in said cleansing operation;

Fig. 2 is an elevation of a modified form of the apparatus disclosed in Fig. 1;

Fig. 3 is a rear view of a part of the apparatus disclosed in Fig. 2, with portions broken away;

Fig. 4 is a detailed view taken on the lines 4—4 of Fig. 3; and,

Fig. 5 is an elevation of the more or less complete vapor adsorbing apparatus seen in Fig. 1, with some parts broken away to show interior construction.

Having reference to the several figures of the drawing, the invention will now be described in detail.

Referring first to Fig. 5, general reference numeral 10 indicates a vapor recovery apparatus. The particular apparatus here disclosed constitutes a twin or double unit, but may be constructed as a single unit, as seen in Fig. 2. Reference characters 12 indicate the twin tanks or containers constituting the main bodies of the recovery apparatus. Within each of the containers 12 is a foraminous layer 14 that forms a porous support for a mass of carbon granules or pellets 16 that form the vapor adsorbing material. The vapors or mixture of air and vapors, which will be discussed hereinafter, enter the apparatus through an opening 18 in a large chamber 20. Within chamber 20 is disposed a fabric bag 22 that serves as a lint filter, and which may be replaced when needed through a door 24. Disposed in rear of the chamber 20 is a fan housing 26 within which is mounted a rotary fan 28. Between chamber 20 and fan housing 26 is a screen 30 that serves to prevent any foreign object that might penetrate the lint bag 22 from passing to the fan 28. The fan housing 26 is connected by a T structure 32 to a duct 34, whose opposite ends extend into neck structures 36, forming upper extremities of each of the casings 12. A valve or damper 38 carried on a rod 40 and manipulated by a handle 42 is capable of controlling communication between each branch of duct 34 and the interior of each casing 12. The valve handle 42 may be latched by a device 44. Beneath the foraminous layer 14 of each of the casings 12 is a lower neck structure 46 that is closed by a lower plate 48. The lower neck structures 46 each have an outlet opening 50 extending from a side thereof controlled by valves or dampers similar to member 38, but not specifically shown. Under some conditions it might be desirable to connect the outlet openings 50 to a duct extending out of the building, and such a duct 52 is shown extending from the outlet opening of the container at the right of the figure.

A steam separator 54 has two conduits 56, 58, extending to a connection 60 on the lower extremities of each of the tanks 12 for supplying steam to each of the units.

A plate 62 is secured to the upper limits of each of the upper neck structures 36, and extending from each of the plates 62 is a conduit 64 containing a valve 66 that extends to a condenser 68. Each of the units also has a safety release valve 70 to prevent the build-up of pressure within the respective units.

The condenser 68 extends to a liquid separator 72 which serves to separate the distilled recovered solvent from water condensed as a result of steam distillation.

For control purposes a U tube 74, which has one branch open to atmosphere is connected through its other branch by a flexible conduit to a connection 76 in the T 32.

Flexible sniffer tubes 78, for testing the quality of gas passing through the adsorption mass, extend from connections 80 in the lower portion 46 of each of the casings 12.

Referring now to Fig. 1, is shown the manner in which the recovery apparatus 10 is used in conjunction with a solvent cleansing operation, and more particularly the dry cleaning of garments and fabrics.

Reference character 82 designates the casing of a washer-extractor, containing a rotary cage shown in dotted lines and designated by reference character 84. An exterior door 86 in casing 82 provides a means of introducing and removing garments with respect to the cage 84. The casing 82 contains a solvent reservoir 88 in its lower extremity and means, not shown, are provided for circulating the cleansing solvent from reservoir 88 through the garments or fabrics within the cage 84. Washer-extractors are known in the art and no novelty is claimed as to this unit. A housing 90, whose interior is in communication with the interior of casing 82, forms a valve chamber and contains a valve or damper not shown. The details of the damper construction are fully disclosed in Fig. 4. Extending from the housing 90 is a duct 92 that communicates with the interior of a trunk duct 94 that extends to opening 18 of chamber 20 of the recovery apparatus 10.

Positioned adjacent the washer-extractor 82 is a recovery tumbler consisting of a casing structure 96 within which is disposed a rotary cage 98, shown in dotted lines. A door 100 provides access to the cage 98. The recovery tumbler 96 is intended to receive the cleansed fabrics from the washer-extractor 82, and is provided with means for removing and recovering the residual portion of solvent remaining in the garments. A recovery apparatus associated with the recovery tumbler 96 includes a blower 102 whose low pressure side is in communication with the rotary cage 98. A duct 104 extends from the high pressure side of blower 102 and forms a part of an air circuit that includes a chamber 106 which contains a lint bag 108. In communication with chamber 106 is a second chamber 110 containing the legend "cold" to indicate the presence of suitable condenser coils whose purpose is to condense solvent from air passing therethrough. Another chamber indicated by reference character 112 and also indicated by the legend "hot" contains heating coils for re-heating the air passing from chamber 110. A return duct 114 extends from chamber 112 to the cage 98. Extending into duct 114 is a branch duct 116 whose outer end penetrates the casing 96 and is controlled by a damper or door 118. Indicated by the dotted line showing 120 is a connection to a valve mechanism 90a that is similar to housing 90 on the washer-extractor 82. A duct 122 extends from housing 90a to the trunk duct 94.

Depending from the trunk duct 94 in appropriate relationship with the various elements of the cleaning apparatus are a pair of ducts 124, 126, that are open on their outer ends and extend downwardly to adjacent the base of the apparatus, or to any convenient low lying areas, such as the floor surface 128. Each of the ducts 124, 126, is enclosed on its lower open end by a cage 130 formed of foraminous metal. Within each of said ducts is a normally closed damper 132 formed of thin, relatively light-weight metal, and hingedly supported for movement on the interior of each of the ducts at 134. Also, depending from the trunk duct 94 is a flexible hose 136 that is provided with a nozzle 138 at its outer end within which is a manually operable valve 140. The hose 136 constitutes a flexible pick-up duct that may be desired to pick up vapors at any place adjacent the operation, whereas ducts 124, 126, constitute inflexible tubes that are positioned at selected fixed positions with respect to the various elements of the cleaning apparatus.

Referring next to Figs. 2, 3 and 4, is shown an arrangement that is substantially identical to that disclosed in Fig. 1. In some cleaning plants, the volume of business requires practically continuous operation, but where the volume is not so great, it is possible to use a single unit for both washing and drying the garments. Reference character 142 designates the casing of a combined washer-tumbler containing a rotary cage 144. An access door 146 is provided for entry and removal of the garments with respect to the cage 144. A reservoir 148 is provided for liquid solvent, and pumping means, not shown, but disposed within a base structure 150, are provided for circulating the liquid solvent between the reservoir 148 and the rotary cage 144. After the fabrics have been washed and a major portion of the liquid solvent removed therefrom, a part of the remaining solvent is removed by a drying arrangement, similar to that disclosed in tumbler 96, and to avoid confusion, the elements of the drying circuit bear the same reference characters as those disclosed in Fig. 1. A valve housing 90b is positioned on the top of casing 142 and is connected by a conduit 152 with the main trunk conduit 94a.

In this disclosure, there are also a pair of pick-up ducts designated as reference characters 124a and 126a, each provided with a foraminous cage 130a at the lower end thereof, and each containing a damper 132a pivoted at 134a within the interior of the respective ducts. Likewise, this figure also discloses a flexible hose 136a provided with a nozzle 138a containing a manual valve 140a.

Where the dry cleaning operation is on a smaller scale, it may not be necessary to use the double recovery unit disclosed in Fig. 5, and as here illustrated, only a single adsorption unit 12 is shown. Under normal conditions, the body of activated carbon within one of the containers 12 is sufficient to adsorb all of the vapors that are normally created in connection with the operation of a single cleaning unit in one day's time. In the event that the carbon within casing 12 became saturated before the end of a day's operation, to prevent shutting the system down, the remaining vapors might be vented to atmosphere. For this purpose, a duct 154 having an elbow construction 156 within which is disposed a control damper 158, similar in nature to the dampers within casings 90, 90a, and 90b, and shown in detail in Fig. 4.

Referring now to Fig. 4, reference character 90c discloses a housing similar to housings 90, 90a and 90b, having an inlet opening 162. A duct 164 extends into one portion of the casing 90c and its inner end 166 is adapted to be engaged by a plate 168 carrying a resilient gasket 170 on its outer face. The plate 168 is carried by a rod 172 that is journaled within the housing 90c on a bearing 174. A vapor tight journal 176 forms a bearing in casing 90c for the outer end of rod 172. A handle 178 extends angularly from the outer end of rod 172 and is adapted to be latched in a keeper 180. Valve casing 90c and its associated parts are described and claimed in my co-pending application Serial No. 644,155.

The general operation of the process and apparatus is as follows.

The solvent cleansing and drying of garments or fabrics is a standard process. A load of garments or other fabrics are placed in the washer-extractor 82 of Fig. 1, and the door 86 is closed so that during the washing operation the casing 82 forms a sealed element. The cage 84 is slowly rotated, and solvent from the reservoir 88 is pumped or otherwise circulated into contact with the garments or other materials for a predetermined period of time to remove soil therefrom. When the washing period is completed, the circulation of solvent is terminated, and cage 84 is rotated at a considerably greater rate of speed to extract liquid solvent from the fabrics by centrifugal action. When the major portion of the liquid solvent has been extracted from the fabrics, they are removed from cage 84 of the washer-extractor and transferred to the drier 96. In Fig. 1, only one drier is disclosed, but frequently there is a difference in capacity between the washer-extractor and the drier, and in many plants it is customary to use two driers with each washer. When the damp garments have been transferred to the drier, and door 100 is closed, the cage 98 is mechanically rotated and a closed circuit of air is passed through the tumbling garments. Air is withdrawn from cage 98 by blower 102 that discharges into duct 104, whence the column of withdrawn air passes through the lint bag 108 to remove particles of lint that have become separated from the garments. The filtered air then enters the cooling chamber 110, where it passes in contact with cold coils therein to condense solvent therefrom, which solvent in a liquid condition passes to a reservoir, not shown, whence it is returned to the reservoir 88 of washer 82. The chilled air then enters chamber 112 where it is brought into contact with heating coils capable of heating the column of air to a temperature of at least 160° F., whence the heated air returns through duct 114 to the cage 98 to again pick up solvent vapors from the fabrics. The drying cycle is continued in the manner described for a predetermined period of time, whence the garments are removed for finishing and delivery to the customer.

Assuming that both washer 82 and drier 96 are in operation in the manner described, during this period the dampers in casings 90 and 90a would be in a closed position to seal the vents from casings 82 and 96, and damper 118 on casing 96 would be closed. With fan 28 in operation, the pressure in trunk duct 94 would be less than barometric pressure and the dampers 132 in the pick-up ducts 124, 126 would be in an open position by virtue of the currents of air being drawn in through the open end of these ducts. The cages 130 on the outer ends of the ducts serve to prevent any foreign objects from being drawn into the ducting system for it will be recognized that the capacity of the fan 28 will be such as to draw a relatively large volume of air through the pick-up ducts and it is the intent and purpose of these ducts to gather vapors from adjacent the base of the equipment, or the floor surface. The vapors which are present about the floor surface might have been the result of leakage of liquid or gaseous solvent from the equipment, or they may have originated from the garments or other materials during transfer to and from the cleaning equipment. All of the air drawn in through the pick-up ducts 124, 126 passes into the trunk duct 94 and thence through the lint bag 22 for removal of any foreign material before passage to fan 28, whence the mixture of gases are delivered to the activated carbon adsorption mass in one or both containers 12. While it is in some instances desirable to use both units disclosed in Fig. 5 simultaneously for adsorption, under normal circumstances the carbon mass in one unit is acting as an adsorber, while the other unit is undergoing steam distillation for the recovery of adsorbed solvent.

Assuming now that the load of garments in drier 96 has been tumbled in the circuit of hot air for a predetermined period of time, with the cage 98 still rotating, the damper in casing 90a is opened so that the interior of the drier is now in communication with the duct 94 and the blowers 102 and 28 are acting in series. Although the source of heat within compartment 112 is terminated, the atmosphere within casing 96 is highly enriched with solvent vapors that will be drawn through casing 90a and duct 122 into the trunk duct 94. Such vapors may also be relatively hot, since the fabrics and the equipment will have been heated to at least 160° F. While it may be practical to dispose a cooling coil in the ducting system, including the trunk duct 94, similar to the cooling coils in compartment 110, I prefer to utilize atmospheric air to reduce the temperature of the hot vapors. This is accomplished in part by the simultaneous opening of damper 118 that is mechanically connected to the damper mechanism within casing 90a. When damper 118 is also opened, ambient air is drawn through the drier by blower 102 that discharges into duct 122. Also, the dampers 132 in the floor ducts 124, 126 will be open, but the extent of their opening will have been reduced with the opening of the damper in casing 90a, since the new influction of air will tend to off-set the low pressure in the trunk duct 94. The blending of ambient air through damper 118 tends to sweep the solvent vapors from drier 96 as well as cooling said vapors and also diluting the concentration thereof.

I have found that when substantially pure vapors of chlorinated hydrocarbon solvents, such as perchlorethylene, are evolved into the ducting system, that the adsorbing capacity of the body of activated carbon in container 12 is reduced by substantially 50%. Thus, when substantially pure vapors are passed to the carbon bed until the odor of such vapors is apparent at the discharge opening 50, or through the sniffer tube 78, and the carbon bed is then distilled, only about 2½ gallons of liquid solvent are recovered by steam distillation; whereas, if the vapors entering the carbon bed are diluted to the extent that their concentration in duct 94 constitutes a minor proportion of the gases in said duct, and the operation continued until there is an odor break-through beyond the carbon bed, and the bed is then steam distilled in the usual manner, the recovery of liquid solvent is somewhat more than 5 gallons of liquid, or double the output when the gases are highly enriched with solvent vapors.

I have also discovered that as the temperature of the vapors passing to the carbon bed are increased, the adsorbing efficiency of the carbon granules progressively declines. Thus, if the temperature of the mixture of air and vapors passing to the carbon bed is less than 100° F. the recovery of solvent vapors is substantially complete; however, when the temperature of the mixture arose to substantially 150° F., as a result of passing through the heated equipment and the heated fabrics, the adsorptive efficiency of the activated carbon declined to about 50%. Therefore, the ambient air which enters the system and is blended with the vapors therein serves the dual function of reducing the concentration of vapors as well as the temperature thereof to increase the adsorbing efficiency of the activated carbon mass.

Assuming next that the dried garments have been removed from drier 96, and with the system open so that ambient air is entering door 100 as well as damper 118, and possibly through the pick-up ducts 124, 126, when the batch of garments then undergoing cleansing in the washer 82 are terminated, the damper in casing 90 is opened to vent vapors from the washer, and door 86 is opened to transfer the washed garments to the drier 96. While not specifically shown, casing 82 may also be provided with an exhausting blower, similar to blower 102, which positively discharges the gases from said casing into duct 92. Also, as mentioned heretofore, in many installations the arrangement will include two driers and one washer, and therefore, all three units may be simultaneously discharging gases into the trunk duct 94. Under these circumstances, the dampers 132 in the pick-up ducts 124, 126, would undoubtedly be closed, for it is quite like that a pressure above barometric pressure exists in the trunk duct 94, and therefore, the dampers 132 prevent the contents of the trunk duct from escaping into the working space of the building within which the equipment is housed.

The operation of the arrangement shown in Fig. 2 is substantially similar to that shown in conjunction with Fig. 1. However, occasions may arise towards the end of an operating day when the carbon mass in container 12 is substantially saturated with solvent vapors. Under such circumstances, instead of shutting the unit down, the damper in the upper portion of casing 12 is closed and the mixture is vented to atmosphere exterior to the building through duct 154.

Considering next the operation of the mechanism disclosed in Fig. 5, it has been stated heretofore that the gases passing from the fan 28 pass to the T 32 into duct 34, and then by manipulation of the dampers 38 for each of the units, said vapors may enter either one or both of the containers 12, whence it passes downwardly through the carbon mass, and then vented through the bottom of the container under the control of the dampers therein. By passing the vapor ladened gases downwardly through the mass of carbon, the major portion of the solvent vapors is adsorbed by the granules or pellets disposed towards the upward part of the mass. Because of this arrangement, the subsequent upward movement of the steam gives a more complete recovery of the adsorbed solvent.

The manometer or U tube 74 is provided for the convenience of the operator. It serves to measure the pressure on the discharge side of fan 28 and may be utilized to detect irregular operation of the unit.

When either unit becomes saturated wtih solvent vapors, the upper and lower dampers of one of the containers is closed and dry steam is admitted into the base of the container. Either of the control valves 66 is opened to the condenser 68, and the distillate is condensed and separated in member 72.

The principal advantage of this invention resides in the provision of means for collecting and conserving solvent vapors heretofore lost in conjunction with the cleansing of materials.

Another advantage resides in the increased efficiency of adsorption of the solvent vapors by the dilution of such vapors with ambient air within a collecting system, which presumably reduces the vapor pressure of the solvent vapors and thereby increases the adsorption capacity of the adsorption material.

Another advantage resides in an efficient means of cooling hot solvent vapors within a collecting system so as to increase the adsorbing capacity of the adsorption material.

A further advantage resides in the provision of means for picking up all of the solvent vapors from, in, and about a dry cleaning operation, to thereby eliminate the pollution of the air in the work space with the noxious odors of synthetic solvents.

A further advantage resides in the fact that with the apparatus disclosed herein, there is a tremendous saving in the cleansing solvent. By actual test with the apparatus disclosed herein, it has been found that approximately 5 to 6 times the weight of textiles can be cleansed with solvents such as perchlorethylene than was possible heretofore.

While the foregoing description has been limited to the textile cleaning industry, the process is equally applicable to other industrial operations involving the use of solvents, such as the degreasing of metal parts, or other processes that involve the use of volatile solvents. While the equipment used for degreasing metal parts differs somewhat from that utilized for the cleaning of textiles, the recovery of vapors in the various phases of the operation are substantially identical.

It will be appreciated, therefore, that the drawings are illustrative of one manner of conducting the process referred to herein and are illustrative of one form of apparatus, and therefore, the invention is not restricted to the illustrations, but is defined in the terms of the appended claims.

I claim:

1. In a process of treating material with a volatile organic solvent, a method of conserving vapors of said solvent, comprising the steps of enclosing a vapor adsorbing material in a confined channel, withdrawing gas from said channel through said adsorbing material, intermittently admitting to said channel a gas containing a very high percentage of solvent vapors therein which produces a sudden heating of the adsorbing material, and admitting to said channel whenever the pressure therein is less than barometric pressure, a gas containing a relatively large percentage of air at a temperature approximating ambient temperature, the amount of air passing through the adsorbing material being sufficient to establish the mean temperature of said adsorbing material during the period said gases are passing therethrough to be not substantially higher than ambient temperature.

2. In a process of treating material with a volatile organic solvent, a method of conserving vapors of said solvent, comprising the steps of enclosing a vapor adsorbing material in a confined channel, withdrawing gas from said channel through said adsorbing material, intermittently admitting to said channel a gas containing a very high percentage of solvent vapors which when brought into contact with said adsorbing material causes a substantial rise in temperature of said material, and admitting to said channel whenever the pressure therein is less than barometric pressure a gas containing a relatively large percentage of air at a temperature approximately ambient temperature, the amount of air in the total volume of said gases passing through said channel being sufficient to establish the mean temperature of said gases passing to the adsorbing material to be not substantially higher than ambient temperature.

3. In a process of treating material with a volatile organic solvent, a method of conserving vapors of said solvent, comprising the steps of enclosing a vapor adsorbing material in a confined channel, passing a gas composed principally of air not substantially in excess of ambient temperature through said channel and the adsorbing material therein, intermittently interrupting the flow of said gas by admitting to said channel a gas containing a very high percentage of solvent vapors which when brought into contact with said adsorbing material causes a sudden rise in temperature of said material, and simultaneously passing air of a temperature not substantially in excess of ambient temperature to the source of vapor and thence into the channel to purge the vapors to the adsorbing material and then progressively increase the proportion of non-adsorbable gas passing to the adsorbing material, the amount of air in the total volume of said gases passing to the adsorbing material after the admission of solvent vapors to said material being sufficient to quickly reduce the temperature of the adsorbing material to not substantially in excess of ambient temperature.

4. In a process of treating material with a volatile organic solvent, a method of conserving vapors of said solvent, comprising the steps of enclosing a vapor adsorbing material in a confined channel, passing a gas composed principally of air not substantially in excess of ambient temperature through said channel and the adsorbing material therein, intermittently interrupting the flow of said first gas by admitting to said channel a second gas containing a very high percentage of solvent vapors of a temperature substantially in excess of ambient temperature which when brought into contact with said adsorbing material causes a rise in temperature of said material, and simultaneously passing air of a temperature not substantially in excess of ambient temperature to the source of vapor and thence into the channel to purge the vapors to the adsorbing material and then progressively increase the proportion of non-adsorbable gas passing therethrough, the amount of air in the total volume of said gases passing through the channel after the admission of solvent vapors being sufficient to quickly reduce the mean temperature of the total volume of said gases passing to the adsorbing material to be substantially ambient temperature.

5. In a process of treating material with a volatile organic solvent, a method of conserving vapors of said solvent, comprising the steps of enclosing a vapor adsorbing material in a confined channel, momentarily passing to said channel a gas containing sufficient solvent vapors to cause a substantial rise in the temperature of said adsorbing material, and admitting to said channel air which is relatively free of solvent vapors at a temperature not in excess of ambient temperature for a period in which the amount of air in the total volume of said gases passing through the adsorbing material establishes the mean temperature of said adsorbing material while said gases are passing therethrough to be not substantially in excess of ambient temperature.

6. In a process of treating material with a volatile organic solvent, a method of conserving vapors of said solvent, comprising the steps of enclosing a vapor adsorbing material in a confined channel, passing through said channel to the adsorbing material for a prolonged period a gas composed principally of air, and intermittently admitting to said channel a gas containing a relatively high percentage of solvent vapors which produces a sudden heating of said adsorbing material, the amount of air contained in the total volume of said gases passing through the adsorbing material being sufficient to establish the approximate mean temperature of the adsorbing material to be not substantially in excess of the temperature of said air, and to counteract the rise in temperature of said adsorbing material after the vapor rich gas has been passed therethrough.

7. In a process of cleansing fabrics with a volatile halogenated hydrocarbon liquid, embodying subjecting said fabrics to a cleansing action with said liquid within a container, subsequently removing the free liquid from said fabrics, forcibly circulating the gas within said container through a closed circuit associated with said container, alternately cooling and heating the circulated gas to evaporate and condense the major portion of hydrocarbon vapors within said circuit, the improvement comprising connecting said container to a confined channel containing a solvent vapor adsorbing material, venting the gas from said container to the said channel when the major portion of said hydrocarbon vapors have been condensed in said circuit, said gas being of a temperature substantially in excess of ambient temperature and consisting of a high concentration of hydrocarbon vapors, and admitting air which is relatively free of solvent vapors at a temperature not in excess of ambient temperature into said container under a substantial negative pressure to purge the vapors from said container into said channel, the amount of air in the total volume of said gases passing through said channel to the adsorbing material being sufficient to quickly increase the proportion of non-adsorbable gas in said channel and to quickly reduce the mean temperature of said gases passing through the adsorbing material to a temperature not substantially in excess of ambient temperature.

8. In a process of cleansing fabrics with a volatile halogenated hydrocarbon liquid embodying subjecting said fabrics to a cleansing action with said liquid within a container, subsequently removing the major portion of solvent from said container and the fabrics therein, the improvement comprising connecting said container to a confined channel containing a solvent vapor adsorbing material, venting the residual gas from said container through said channel to the adsorbing material, said gas containing a sufficient amount of solvent vapors to cause a substantial rise in temperature of said adsorbing material, and simultaneously admitting air which is relatively free of solvent vapors at a temperature not in excess of ambient temperature into said container under a substantial negative pressure to purge the residual vapors from said container to said adsorbing material, the amount of air in the total volume of said gases passing through the adsorbing material after venting the residual vapors to the channel being sufficient to quickly overcome the heating effect of the adsorbing material caused by the initial surge of vapors thereto, and to quickly reduce the temperature of the adsorbing material to a temperature not substantially in excess of ambient temperature.

9. In a process of cleansing fabrics with a volatile halogenated hydrocarbon liquid, embodying subjecting said fabrics to a cleansing action with said liquid within a container, subsequently removing the free liquid from said container, forcibly circulating the gas within said container through a closed circuit associated with said container, alternately cooling and heating the circulated gas to evaporate and condense the major portion of hydrocarbon vapors within said circuit, the improvement comprising connecting said container to a confined channel containing a solvent vapor adsorbing material, withdrawing gas from said channel through said adsorbing material, admitting to said channel from a region adjacent the base of said container a gas composed principally of air but containing solvent vapors when present in the area adjacent said container, venting the gas from said container to said channel when the major portion of said hydrocarbon vapors have been condensed in said circuit, said gas containing a relatively large amount of solvent vapors, and admitting air at a temperature not in excess of ambient temperature into said container under a substantial negative pressure to purge the vapors from said container into said channel, the total amount of said gases admitted to said channel from either adjacent the floor region or the container remaining substantially constant, the amount of air in the total volume of said gases passing through said channel to the adsorbing material being sufficient to quickly increase the proportion of non-adsorbable gas following the venting of said container, and also being sufficient to maintain the temperature of said gases passing to the adsorbing material to be a temperature not greatly in excess of ambient temperature.

10. In a process of cleansing fabrics with a volatile halogenated hydrocarbon liquid, embodying subjecting said fabrics to a cleansing action with said liquid within a first container, subsequently removing the free liquid from said container, transferring said fabrics to a second container, forcibly circulating the gas within said second container through a closed circuit associated with said second container, alternately cooling and heating the circulated gas to evaporate and condense the major portion of hydrocarbon vapors within said circuit, the improvement comprising connecting both of said containers to a confined channel containing a solvent vapor adsorbing material, withdrawing gas from said channel through said adsorbing material, admitting to said channel from a region adjacent the base of said containers a gas composed principally of air but containing solvent vapors when the latter are present in the area adjacent said containers, venting each of said containers to said channel during the admission or removal of fabrics with respect to each of said containers, the gases vented from either of said containers initially containing a relatively large amount of solvent vapors which when brought into contact with said adsorbing material causes a rise in temperature of said material, and admitting air at a temperature not in excess of ambient temperature into each of said containers and under a substantial negative pressure when either of said containers is vented to purge the vapors therein into said channel, the total amount of gases passing through both of said containers into said channel when both containers are simultaneously vented being sufficient to substantially reduce the amount of air admitted to said channel from adjacent the base of the container, the amount of air in the total volume of said gases passing through the channel to the adsorbing material remaining substantially constant while said gases are removed from said channel, and being sufficient to maintain the mean temperature of said gases in said channel passing to the adsorbing material to be not substantially in excess of ambient temperature.

11. In a process of treating a material with a volatile organic solvent in a container, a method of recovering vapors of said solvent, comprising the steps of connecting said container to an enclosed channel containing a body of adsorbing material, withdrawing gas from said channel through said adsorbing material, intermittently admitting to said channel a substantial body of gas containing a high percentage of solvent vapors therein, admitting to said channel from a source other than said container a gas containing a relatively large percentage of air at a temperature approximating ambient temperature, and controlling the admission of air to said channel in accordance with the pressure in said channel and to compel all of the gases in said channel to flow through the adsorbing material, the duration of the period in which air is admitted to said channel being sufficient to establish the mean temperature of said adsorbing material to be not substantially in excess of ambient temperature.

12. In combination with a container in which the vapors of an organic solvent are evolved, said container formed with a controllable vent therein, a system for recovering the vapors of said solvent, comprising a confined channel formed with an inlet and an outlet and enclosing a body of vapor adsorbing material between the inlet and the outlet, said channel joined at its inlet to said container, fluid flow control means disposed in said channel which is positively movable between open and closed positions, a branch channel joining said first named channel between said container and said adsorbing material and extending to a source of air, a blower operatively associated with said first named channel and capable of normally maintaining a negative pressure in said channel, and a pressure responsive damper operatively associated with said branch channel for controlling the admission of air into said first named channel, and maintaining a substantially constant volume of gas flowing to the adsorbing material, said damper moving in the direction of a closed position when the container is vented and the first named flow control means is open, said damper moving in the direction of an open position when the pressure in said first named channel is less than barometric pressure to admit air into said channel between the periods when said container is vented.

13. In combination with a container in which the vapors of an organic solvent are evolved, said container formed with a controllable vent therein, a system for recovering the vapors of said solvent comprising a casing formed with an inlet and an outlet, a bed of vapor adsorbing material disposed in said casing between the inlet and the outlet, a main duct connecting said container and the inlet of said casing, a damper in said duct which positively is movable between open and closed positions, a branch duct extending from said main duct to adjacent the base of said container for collecting spillage and waste vapors from adjacent the container, a blower operatively associated with said main duct and normally capable of maintaining a negative pressure in said duct, and a pressure responsive damper operatively associated with said branch duct for controlling the admission of gases therein from adjacent the base of said container, said damper moving in the direction of a closed position when the container is vented and the first named damper is open, and moving in the direction of an open position when the pressure in said main duct is less than barometric pressure to collect waste vapors and admit ambient air in a large volume to cool the adsorbing material between the periods when said container is vented.

14. A process of recovering a vapor produced by a volatile organic liquid whose boiling point is above ambient temperature at the existing barometric pressure, comprising the steps of enclosing a material for adsorbing said vapor in a confined channel, passing through said channel to the adsorbing material a gas composed principally of air and of a temperature not substantially in excess of ambient temperature, and intermittently admitting to said channel a gas containing a relatively high percentage of said vapor and thereby suddenly heating said adsorbing material above ambient temperature, the amount of air contained in the total volume of gas passing to the adsorbing material being sufficient to maintain the mean temperature of the adsorbing material substantially at ambient temperature and to counteract the rise in temperature of said adsorbing material after the vapor rich gas has passed thereto.

References Cited in the file of this patent

UNITED STATES PATENTS

| | | |
|---|---|---|
| 1,254,725 | Pennock | Jan. 29, 1918 |
| 1,552,316 | Krieg | Sept. 1, 1925 |
| 1,967,940 | Johnson | July 24, 1934 |
| 1,981,234 | Hetzer | Nov. 20, 1934 |
| 2,656,696 | McDonald | Oct. 27, 1953 |
| 2,772,625 | Clark | Dec. 4, 1956 |
| 2,777,534 | McDonald | Jan. 15, 1957 |
| 2,784,661 | Jenn | Mar. 12, 1957 |